United States Patent
Giusti et al.

(10) Patent No.: US 11,685,318 B2
(45) Date of Patent: Jun. 27, 2023

(54) FIXING ASSEMBLY

(71) Applicant: MARELLI EUROPE S.p.A., Corbetta (IT)

(72) Inventors: Ruggero Giusti, Savignano (IT); Pietro Elia, Arluno (IT)

(73) Assignee: MARELLI EUROPE S.p.A., Corbetta (IT)

( * ) Notice: Subject to any disclaimer, the term of this patent is extended or adjusted under 35 U.S.C. 154(b) by 0 days.

(21) Appl. No.: 17/536,871

(22) Filed: Nov. 29, 2021

(65) Prior Publication Data
US 2022/0185198 A1 Jun. 16, 2022

(30) Foreign Application Priority Data
Dec. 11, 2020 (IT) .......................... 102020000030599

(51) Int. Cl.
*B60R 11/00* (2006.01)
*B60R 11/02* (2006.01)

(52) U.S. Cl.
CPC ... *B60R 11/0229* (2013.01); *B60R 2011/0047* (2013.01)

(58) Field of Classification Search
CPC ................. B60R 11/02; B60R 11/0205; B60R 11/02058; B60R 2011/0047; B60R 2011/0005; B60R 2011/0064; B60R 2011/0071; B60R 2011/0073; B60K 37/04; B60K 2370/81; B60K 37/06; B60K 2370/816
USPC ... 248/27.1, 27.3, 544, 685, 220.21, 222.51, 248/223.41, 224.51, 225.11
See application file for complete search history.

(56) References Cited

U.S. PATENT DOCUMENTS

| | | | |
|---|---|---|---|
| 4,881,295 A * | 11/1989 | Odemer | B60R 11/0205 248/27.1 |
| 5,873,749 A | 2/1999 | Takiguchi et al. | |
| 7,380,761 B2 * | 6/2008 | Shillington | F16M 11/10 248/220.21 |
| 7,891,624 B2 * | 2/2011 | Dittmer | F16M 11/041 248/323 |

(Continued)

OTHER PUBLICATIONS

Search Report for Italian Patent Application No. IT202000030599 dated Mar. 12, 2021.

*Primary Examiner* — Terrell L McKinnon
*Assistant Examiner* — Michael McDuffie
(74) *Attorney, Agent, or Firm* — Howard & Howard Attorneys PLLC

(57) ABSTRACT

A fixing assembly has a support element adapted to be fixed to a component of a vehicle, and a frame adapted to support an accessory in a fixed relative position and connected to the support element in a fixed position; the support element has two openings which are engaged by respective protruding pins of the frame so as to allow a rotation of the frame towards the support element during a mounting step in which the protruding pins are inserted in the openings; a snap fitting prevents the displacement of the frame at the end of the aforementioned rotation, and then blocking devices, of the screw type, secure the frame in a stable position; the snap fitting has an elastically deformable element which is snap-fitted to a retention shoulder and forms part of a portion made of polymeric or elastomeric material of one between the support element and the frame.

14 Claims, 7 Drawing Sheets

(56) References Cited

U.S. PATENT DOCUMENTS

| | | | | |
|---|---|---|---|---|
| 8,186,637 | B2* | 5/2012 | Walters | F16M 11/12 |
| | | | | 248/222.51 |
| 9,517,731 | B2* | 12/2016 | Dry | B60R 11/02 |
| 9,914,407 | B2* | 3/2018 | Zeiger | B60R 13/0256 |
| 10,509,302 | B2* | 12/2019 | Schuh | F16M 11/24 |
| 2005/0051672 | A1* | 3/2005 | Dean | G11B 33/128 |
| 2007/0242172 | A1* | 10/2007 | Macholz | B60R 11/02 |
| | | | | 348/837 |
| 2010/0230549 | A1* | 9/2010 | Probasco | H05K 5/0204 |
| | | | | 248/27.1 |
| 2012/0241572 | A1* | 9/2012 | McClain | B60R 11/0258 |
| | | | | 248/220.21 |
| 2013/0081457 | A1* | 4/2013 | Wilson | G01M 17/02 |
| | | | | 73/146 |
| 2014/0347796 | A1 | 11/2014 | Isquierdo et al. | |
| 2016/0167593 | A1 | 6/2016 | Dry et al. | |
| 2019/0283881 | A1* | 9/2019 | Colletti | B64D 11/00152 |
| 2021/0025544 | A1* | 1/2021 | Garcia | A61G 3/0209 |

* cited by examiner

FIXING ASSEMBLY

CROSS-REFERENCE TO RELATED APPLICATIONS

This patent application claims priority from Italian patent application no. 102020000030599 filed on Dec. 11, 2020, the entire disclosure of which is incorporated herein by reference.

TECHNICAL FIELD

The present invention relates to a fixing assembly for fixing an accessory to a component inside a passenger compartment of a vehicle.

BACKGROUND OF THE INVENTION

As is known, electronic accessories, such as displays or panels having control buttons, can be fixed to internal components of a vehicle, for example to the dashboard of the passenger compartment, by means of respective fixing assemblies.

Fixing assemblies of a known type generally comprise a support element, which can be fixed directly to the dashboard or integrated therein, and a frame which supports the accessory and which is coupled to the support element in a fixed position during vehicle fitting.

The fixing of the frame to the support element in the fixing assemblies of a known type is generally made by approaching and subsequently screwing the frame to the support element.

In order to achieve an aesthetically and functionally effective fixing, the relative positioning between the support element and the frame must be bound by relatively narrow tolerances, which are defined during the design phase. In particular, in an attempt to guide the operator during fixing, the frame and the support element comprise one or more mechanical references, which define an ideal reference system for the relative positioning between the support element and the frame.

However, during screwing operations, the forces involved and any inaccuracies on the part of the operator can alter the position of the mechanical references within the ideal reference system.

This results in a non-compliance with the tolerances provided and, consequently, affects the quality and aesthetics of the dashboard in the passenger compartment.

In particular, the alteration of the position of mechanical references may be greater in some directions than in others.

The need to have a fixing assembly is therefore felt, wherein the correct relative positioning between the frame and the support element is achieved in an accurate, easy and quick manner, and is maintained even at the end of the fixing operations, thus enabling the design tolerances to be respected.

The need to limit the number of components of the fixing assembly is also felt.

SUMMARY OF THE INVENTION

Aim of the present invention is to provide a fixing assembly which allows the above requirements to be fulfilled in a simple and economical manner.

According to the present invention, a fixing assembly as defined in claim 1 is realized.

BRIEF DESCRIPTION OF THE DRAWINGS

For a better understanding of the present invention, a preferred embodiment is now described, purely by way of non-limiting example, with reference to the attached drawings, wherein.

DETAILED DESCRIPTION OF THE INVENTION

Figure 1:
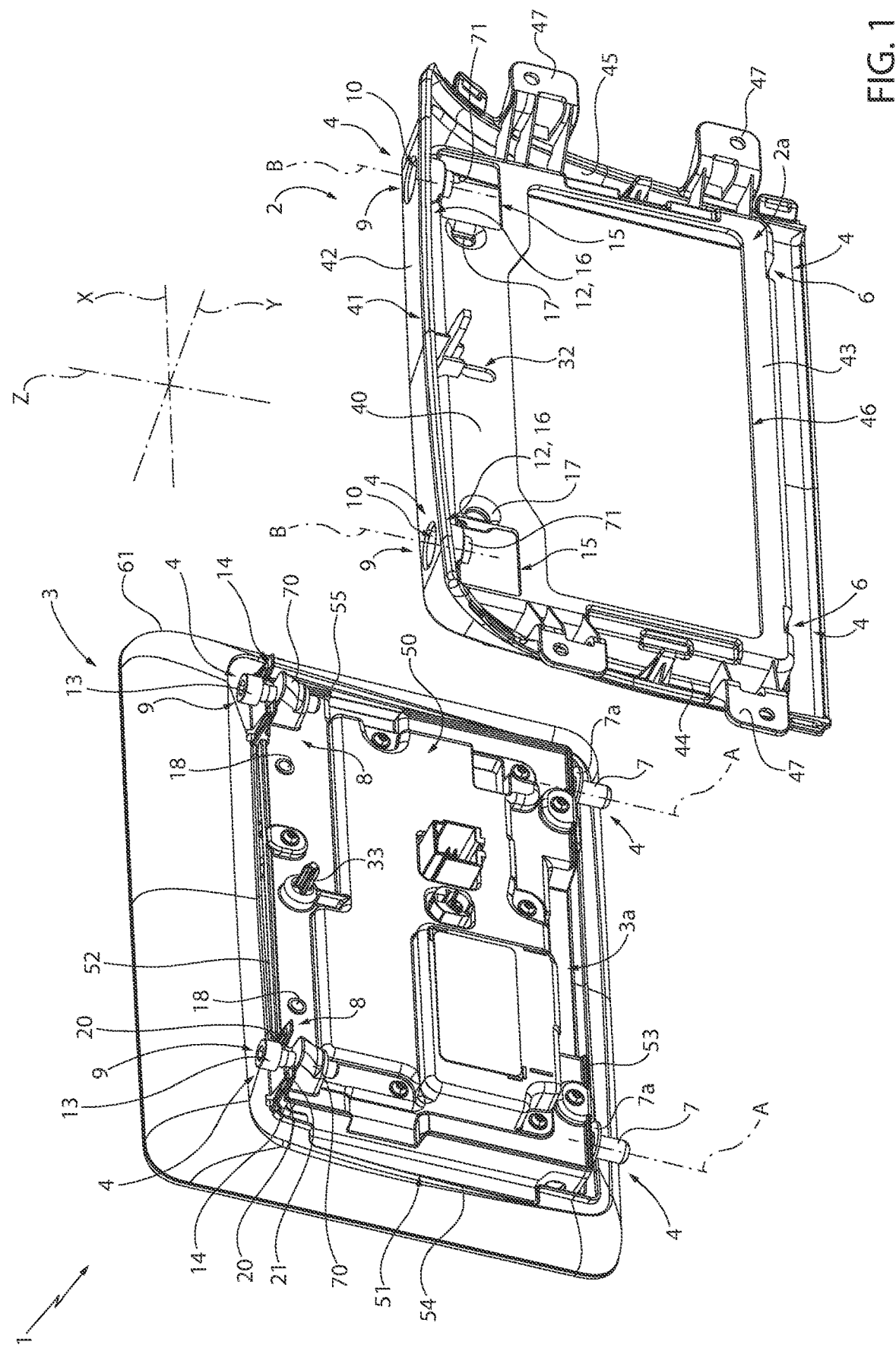
FIGS. 1 and 2 are exploded views of the fixing assembly according to the present invention.
Figure 2:
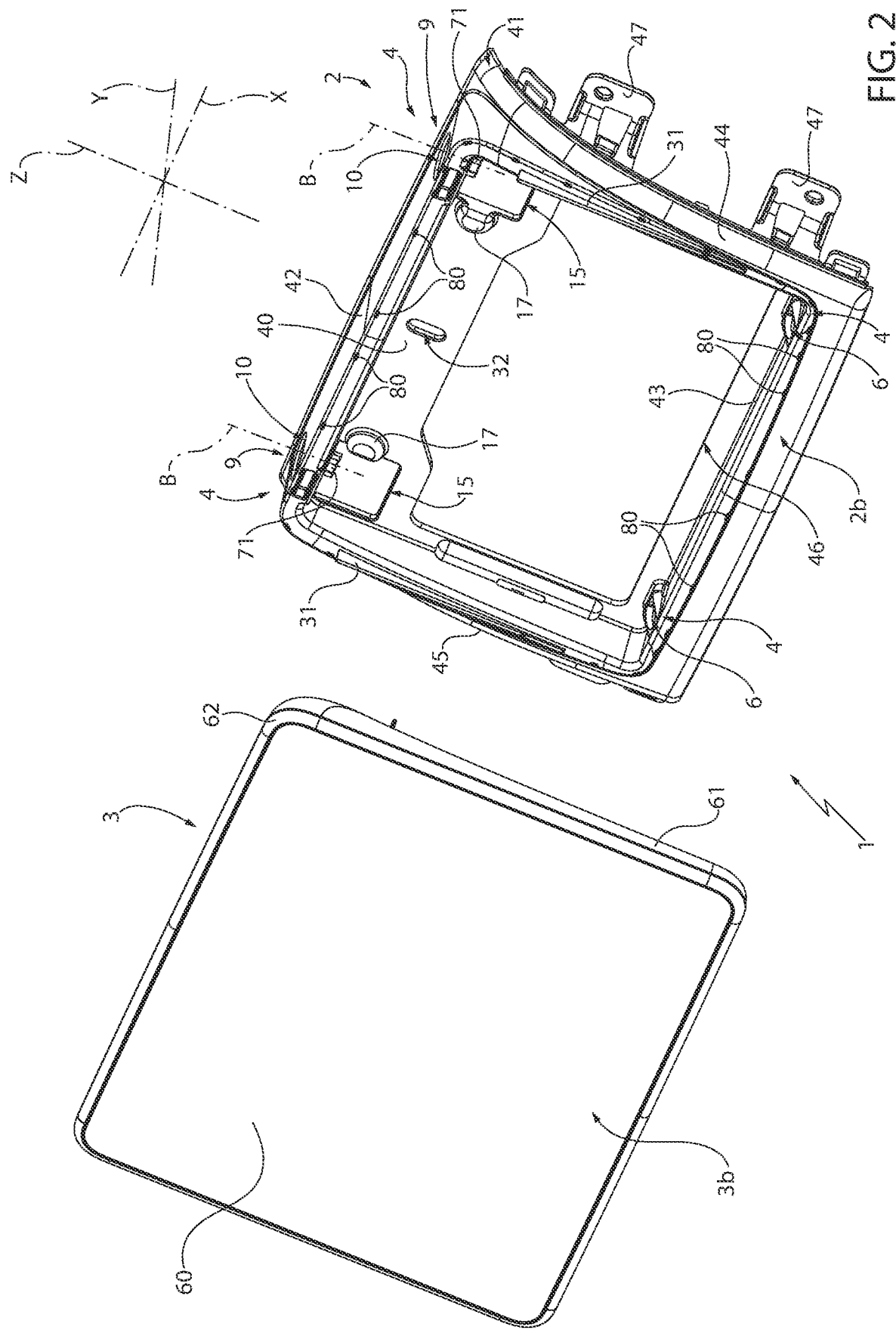

In FIG. 1, the reference number 1 denotes a fixing assembly used to fix an electrical/electronic accessory 60—visible in FIG. 2—to a component (not shown) of a vehicle, specifically to the dashboard of a passenger compartment of the vehicle. Such an accessory 60 may be, for example, a display and/or a control panel.

The fixing assembly 1 comprises a support element 2 adapted to be fixed to the dashboard, or forming part of the dashboard itself, and a frame 3, which supports the accessory 60 in a fixed relative position and is fixed to the support element 2 by means of a fixing device 4.

First of all, it is possible to define a relative design position between the support element 2 and the frame 3, wherein specific position tolerances defined in the design phase are respected.

In particular, the fixing assembly 1 may be placed in an assembled configuration, wherein the support element 2 and the frame 3 are in a fixed relative position considering two directions X and Y orthogonal to each other, but are not stably blocked together. The fixing assembly 1 may be brought into a "tightened" configuration, wherein the support element 2 and the frame 3 are in the relative design position and are stably blocked together by means of blocking devices 9, in particular of the screw type.

The support element 2 comprises a first face 2a (FIGS. 1 and 3B), which in use faces rearwards, i.e. towards the dashboard, and a second face 2b (FIGS. 2 and 3A), which is opposite to the first face 2a along the direction Y mentioned above and is facing, in use, towards the passenger compartment of the vehicle and/or towards the accessory 60.

The frame 3 comprises a third face 3a (FIG. 1) at least partially facing the second face 2b along the direction Y, and a fourth face 3b (FIG. 2), which is opposite the third face 3a along the same direction Y and is therefore facing, in use, towards the passenger compartment of the vehicle and/or towards the accessory 60.

In detail, the support element 2 comprises a main portion 40, defined in particular by a plate having a substantially rectangular outer perimeter, and surrounded by an annular projection 41, which extends in a cantilever fashion starting from said outer perimeter parallel to the direction Y towards the frame 3.

In further detail, the projection 41 comprises an upper portion 42 and a lower portion 43, which are spaced apart from each other along a direction Z, orthogonal to the direction Y and are preferably parallel to the direction X mentioned above. The projection 41 further comprises two lateral portions 44 and 45, which join the lateral ends of the upper portion 42 with those of the lower portion 43 and are spaced apart along the direction X.

In the particular embodiment shown, the support element 2 is symmetrical with respect to a median plane parallel to the directions Z and Y.

Figure 4:
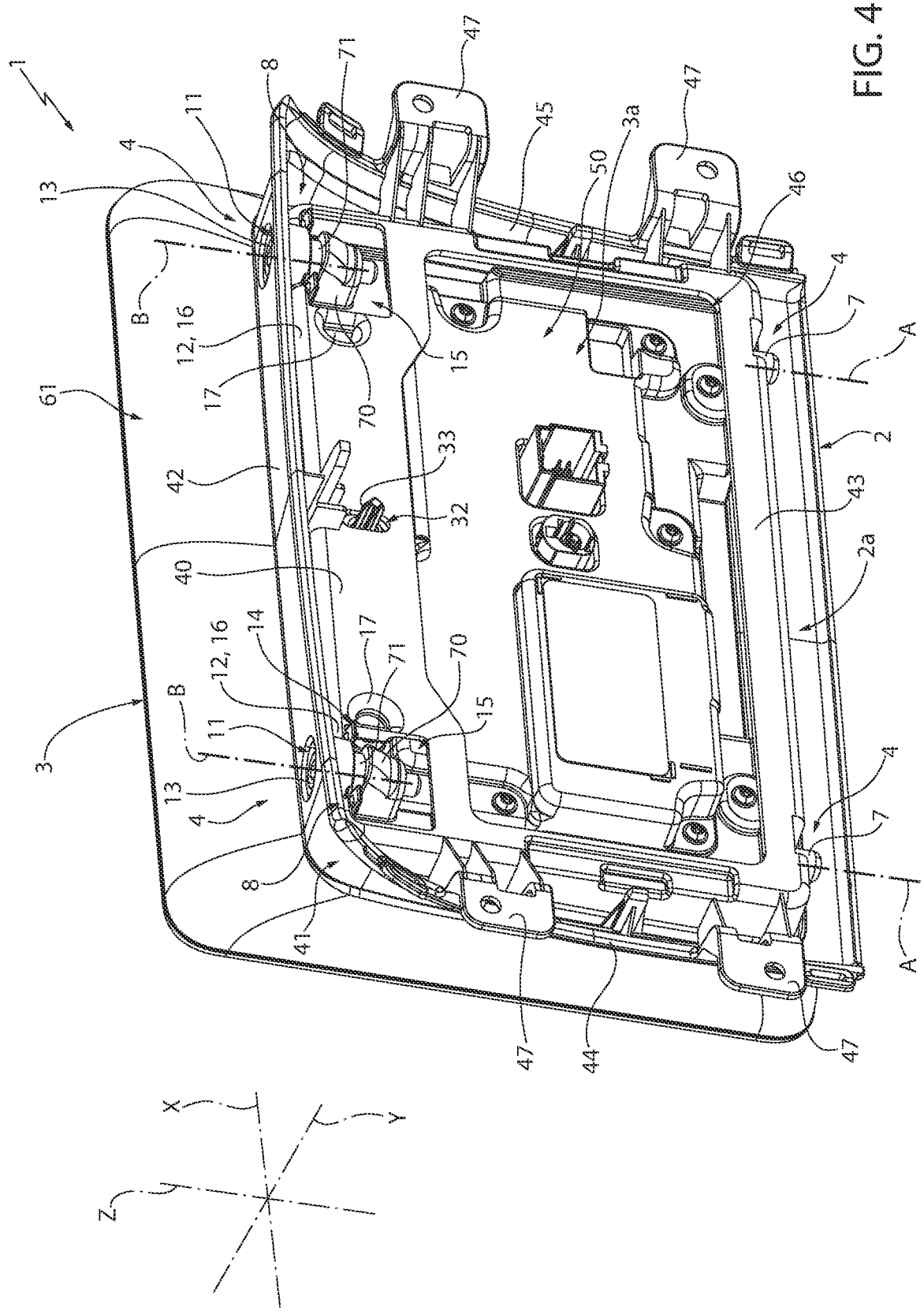
FIG. 4 is a perspective view of the fixing assembly of FIGS. 1 and 2.

Preferably, the support element 2 also has a through opening 46 formed at the main portion 40 parallel to the direction Y. As shown in FIG. 4, the through opening 46 is arranged in such a position that it can be used for the passage of electrical cables, from the inside of the dashboard to the frame 3 and hence to the accessory 60.

If the support element 2 is to be fixed to the dashboard, and therefore is not part of it, as in the example shown, the support element 2 comprises a plurality of fixing appendages 47, for fixing to the dashboard, for example by means of screws (not shown). In detail, the fixing appendages 47 are arranged at the lateral portions 44 and 45 (FIG. 1) and, with respect to the latter, protrude laterally outwards. Obviously, fixing systems other than the appendages 47 might be envisaged.

The frame 3 comprises an attachment portion 50 and a housing portion 61 which are delimited by the third face 3a and by the fourth face 3b, respectively. The attachment portion 50 is coupled in a fixed position to the support element 2 and to the accessory 60. On the other hand, the housing portion 61 ends, at the fourth face 3b, with an edge 62 arranged around the accessory 60. In particular, the housing portion 61 has an annular, substantially rectangular shape so as to surround and house the accessory 60 (FIG. 2).

In the shown solution, the portions 50 and 61 define distinct bodies, fixed to each other in a manner not shown. According to a variant not shown, the portions 50 and 61 constitute parts of a single body, in a single piece. According to a further variant not shown, the portion 61 is absent, so that the accessory 60 is arranged in a cantilever fashion with respect to the frame 3.

The attachment portion 50 is substantially rectangular in shape and comprises an intermediate zone and an outer annular zone 51, which surrounds said intermediate zone (FIG. 1) and comprises an upper portion 52 and a lower portion 53, which are spaced apart along the direction Z, and two lateral portions 54 and 55, which are spaced apart along the direction X and join the lateral ends of the upper portion 52 to those of the lower portion 53.

Preferably, as shown in FIG. 1, the portion 61 protrudes with respect to the outer annular area 51, both outwardly (along the directions X and Z) and forwardly (i.e., along the direction Y opposite to the support element 2, towards the passenger compartment).

The annular projection 41 of the support element 2 surrounds the outer annular area 51; in other words, the annular projection 41 defines a cavity which is engaged by the attachment portion 50 and has, as a bottom wall, the main portion 40.

Moreover, as shown in FIG. 4, the portion 61 has dimensions such that it extends outwards with respect to the projection 41, beyond the upper portion 42 (along the direction Z) and the lateral portions 44, 45 (along the direction X). On the other hand, the lower portion 43 of the annular projection 41 has dimensions such that it extends beyond the lower edge of the portion 61 along the direction Z.

Advantageously, the fixing device 4 comprises at least one opening 6, formed in the support element 2, and at least one pin 7 coaxial to the opening 6 and protruding from the frame 3 along an axis A parallel to the direction Z (alternatively, the opening 6 could be formed in the frame 3 and the pin 7 could protrude from the support element 2).

The pin 7 engages the opening 6 so as to allow a rotation of the frame 3 with respect to the support element 2 about an ideal hinge axis parallel to the direction X during a mounting step, during which the pin 7 is axially inserted in the opening 6. In other words, the coupling between the pin 7 and the opening 6, during mounting, defines a hinge around this axis. Thanks to this rotation, it is possible to bring the frame 3 closer to the support element 2 along the direction Y so as to engage the attachment portion 50 in the cavity defined by the annular projection 41. For example, in order to perform this rotation function, the pin 7 and/or the edge of the opening 6 have a certain elastic deformation or radial clearance along the direction Y.

In the particular embodiment shown, the fixing device 4 comprises two openings 6 which are spaced apart along the direction X, and two pins 7, which engage the two openings 6, respectively (FIG. 4).

Preferably, the openings 6 are cylindrical through holes. Preferably, the openings 6 are made at the lower portion 43 of the projection 41 (FIGS. 2, 3A and 3B); at the same time, the pins 7 protrude downwards with respect to the lower portion 53 (FIG. 1).

Each pin 7 comprises, in particular, a core, which is fixed with respect to the attachment portion 50, and a coating made of polymeric or elastomeric material. In detail, the coating is defined by a cap that is fitted on the core.

In the embodiment shown, the pin 7 protrudes from a head or flange 7a. In particular, during the mounting operations, said head or flange 7a is axially placed in abutment against a surface of the lower portion 43 which is facing towards the centre of the support element 2 due to the weight of the frame 3. In contrast, when the assembly unit 1 is in the tightened configuration, the flange 7a is spaced apart from this surface by the lower portion 43 along the direction Z.

The fixing device 4 further comprises a snap fitting 8 for retaining the frame 3 and preventing it from moving away from the support element 2 in the direction Y at the end of the aforesaid rotation.

With particular reference to FIGS. 1 and 4, the snap fitting 8 comprises a retention shoulder 12 transverse to the direction Y and arranged on the support element 2, and one or more elastically deformable elements 14, which are arranged on the frame 3 and are snap-fitted to the retention shoulder 12. Alternatively, the retention shoulder 12 might be arranged on the frame 3, while the elastically deformable elements 14 might be arranged on the support element 2.

In detail, the elastically deformable elements 14 constitute a single piece with the attachment portion 50 and/or with the housing portion 61 so as to form, with said portion, a single body made of polymeric or elastomeric material. In other words, the elastically deformable elements 14 are not defined by springs or metal elements mounted on the parts made of plastic material, but are themselves defined by plastic or rubber portions, integrated or co-moulded on the frame 3. Otherwise, in the case not shown wherein the elastically deformable elements 14 were arranged on the support element 2, these elements would constitute parts of a single body made of polymeric or elastomeric material together with a portion of the support element 2.

As shown in FIG. 4, the retention shoulder 12 is arranged at the first face 2a, which in the shown case delimits the portion 40 at the rear, while each elastically deformable element 14 extends in a cantilever fashion from the third face 3a parallel to the direction Y.

In addition, one or more openings 15 passing parallel to the direction Y are formed in the support element 2. In particular, the elastically deformable elements 14 pass through the openings 15, so that they protrude beyond the first face 2a.

In the embodiment shown, the support element 2 has two openings 15, which are spaced apart from each other parallel to the direction X. Furthermore, as shown in FIG. 1, the snap fitting 8 comprises two pairs of elastically deformable elements 14. In particular, each pair of elastically deformable elements 14 passes through a respective opening 15.

In detail, the two openings 15 are formed at the main portion 40, near the upper portion 42. In further detail, the openings 15 are formed above the opening 46 with respect to the direction Z and are arranged symmetrically with respect to the median plane of the support element 2.

In the embodiment shown, the openings 15 are substantially rectangular in shape.

Each opening 15, in detail, is delimited superiorly by a straight edge 16, which extends parallel to the direction X. In particular, the retention shoulder 12 is defined by an area of the first face 2a which extends starting from the edge 16 towards the upper portion 42.

Figure 5:
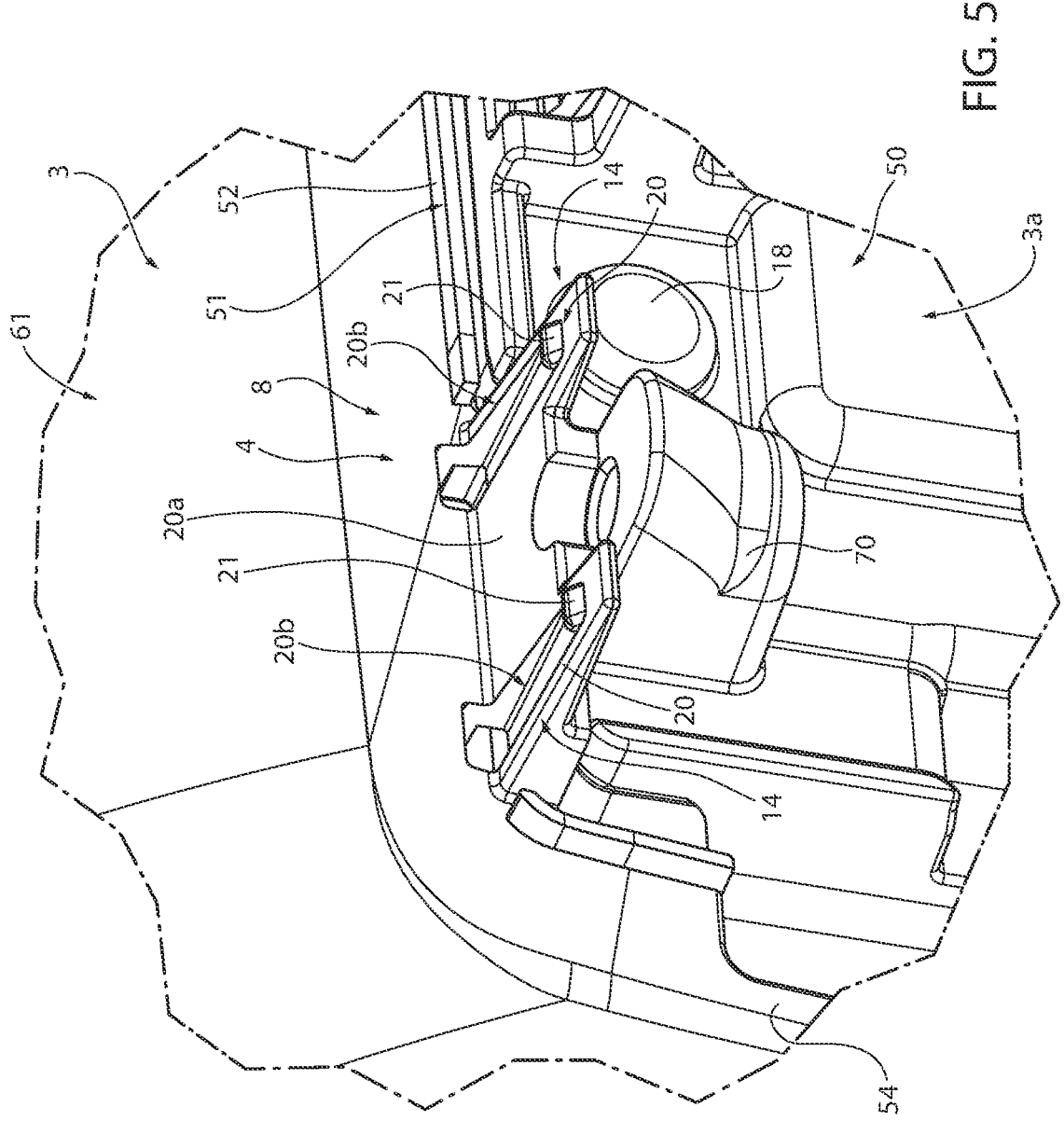
FIG. 5 is a perspective view, showing, on an enlarged scale, a detail of a frame of the fixing assembly of FIGS. 1 and 2.
Figure 6:
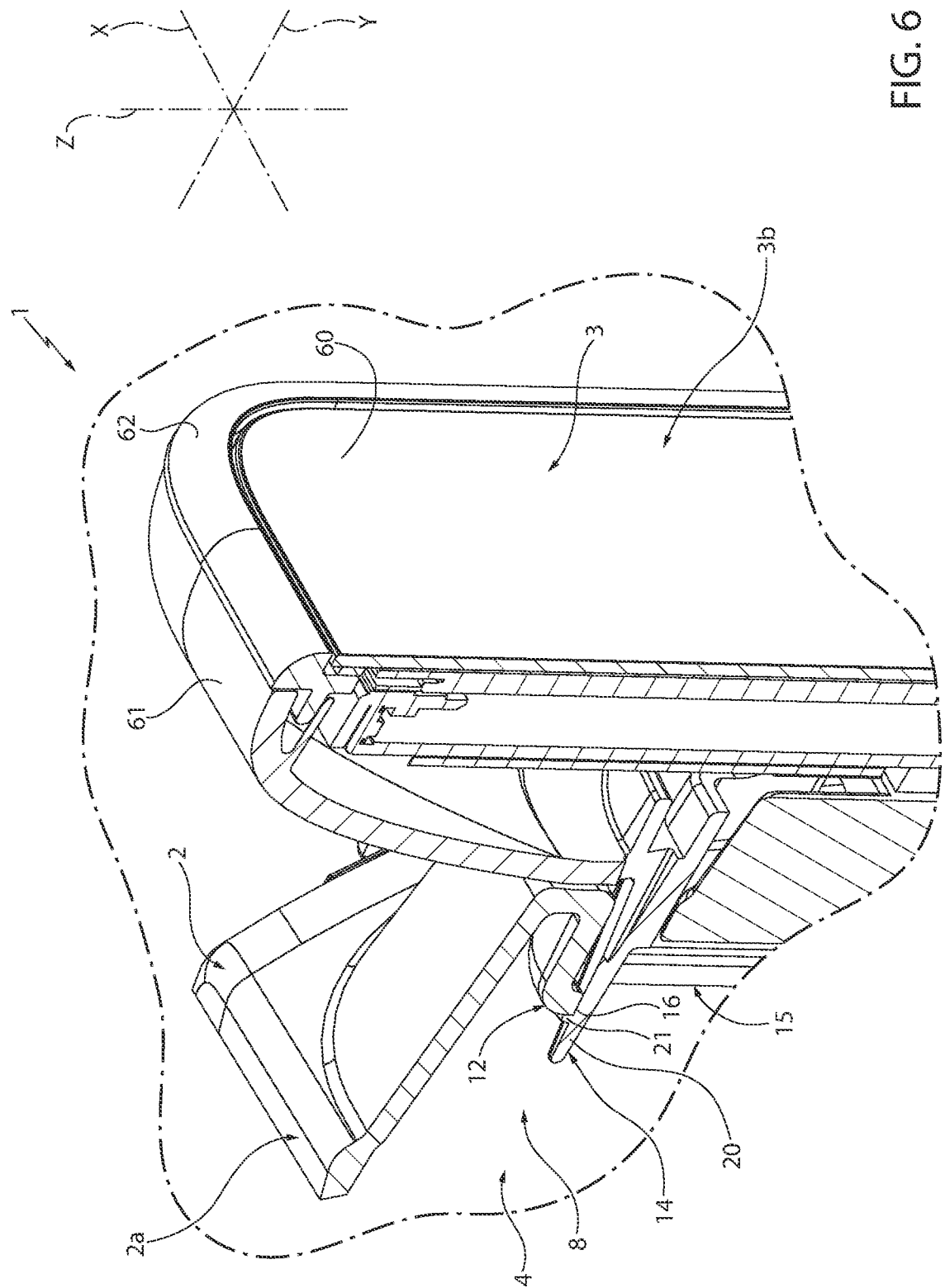
FIGS. 6 and 7 are perspectives showing, on an enlarged scale and in section, a detail of the fixing assembly of FIGS. 1 and 2 according to respective section planes.

Each elastically deformable element 14 comprises an elastically flexible arm 20 which is parallel to the direction Y and a tooth 21 which protrudes from the arm 20 transversely to the direction Y (FIG. 5).

In particular, as shown in FIG. 4, the tooth 21 is arranged beyond the opening 15, and lies on the retention shoulder 12, so as to prevent the frame 3 from moving away from the support element 2 along the direction Y.

As shown in FIG. 5, two arms 20 are provided on each side of the support element 2, as mentioned above. These are spaced from one another along the direction X and protrude parallel to the direction Y starting from a block 20a which preferably has, on its own upper surface, two grooves 20b, aligned with the respective teeth 21. The block 20a and its two arms 20 form a fork defining a seat between the two arms 20.

In particular, the two blocks 20a, in turn, protrude starting from an edge of the housing portion 61, parallel to the direction Y.

In further detail, each groove 20b has an amplitude, along the direction X, which progressively decreases, going from the face 3a towards the corresponding tooth 21 (FIG. 5), so that it has a substantially trapezoidal shape when viewed along the direction Z.

In addition, the thickness of the block 20a and of the arms 20 along the direction Z decreases, proceeding in the direction Y away from the face 3a. In particular, the arms 20 assume a flat shape, of the flange or lamella type, orthogonal to the direction Z.

In particular, during mounting, by rotating the frame towards the support element 2 around the direction X while the pins 7 are inserted, the free end of the arms 20 and their teeth 21 rest against the edge 16 and slide in a direction substantially parallel to the direction Y, deforming and/or bending in the direction opposite to the edge 16. In order to facilitate this deformation/bending, the tooth 21 and/or the free end of the arm 20 are delimited by inclined lead-in surfaces, so as to have a wedge shape and function, whereby the edge 16 tends to exert on the arm 20 and/or on the tooth 21 a pressure action towards the centre of the frame 3 while resting and sliding.

This deformation allows each tooth 21 to go beyond the edge 16 and the relative opening 15, until it snap-fits, that is, it returns elastically to the non-deformed position, causing the coupling with the retention shoulder 12.

With particular reference to FIG. 1, each blocking device 9 comprises a first hole 10 obtained in the support element 2 along an axis B parallel to the direction Z, a second hole 11 formed in the frame 3 and coaxial to the first hole 10, and a screw or a pin 13 which engages the first and the second holes 10, 11.

The blocking devices 9 block the frame 3 to the support element 2 in a fixed position after the elastically deformable elements 14 have been snap-fitted to the retention shoulder 12 during mounting. Therefore, the fixing assembly 1 passes from the assembled configuration to the tightened configuration after the screw 13 has been inserted in the first and second holes 10, 11.

In the embodiment shown, the two blocking devices 9 are spaced from one another along the direction X so as to be arranged in positions adjacent to respective elastically deformable elements 14 at each side of the assembly 1.

In detail, for each side of the assembly 1, two elastically deformable elements 14 are arranged in diametrically opposite positions with respect to the corresponding blocking device 9 along the direction X. In particular, each blocking device 9 extends along the corresponding axis B through the seat between the arms 20.

The two blocking devices 9, as well as the snap fitting 8, are preferably arranged on the opposite side to where the pins 7 and the openings 6 are provided, considering the direction Z. In particular, the first holes 10 are obtained near the upper portion 42 of the projection 41, and the second holes 11 are obtained near the upper portion 52.

Preferably, the first holes 10 are obtained through the upper portion 42 and in two protuberances 71 that extend in a cantilever fashion parallel to the direction Z from the upper portion 42 at the openings 15 (FIGS. 1 and 4).

In particular, the second holes 11 are formed in respective protuberances 70, which form part of the attachment portion 50 and extend in a cantilever fashion from the third face 3a parallel to the direction Y (FIG. 5). In particular, these protuberances 70 protrude from the upper portion 52 parallel to the direction Y, and are arranged below the elastically deformable elements 14 along the direction Z.

More specifically, each protuberance 71 has a hemicylindrical shape and only wraps around the respective screw 13 at the rear. In detail, each protuberance 71 is placed to rest against the corresponding block 20a, along the direction Y, and against the corresponding protuberance 70, along the direction Z (FIG. 4).

Figure 7:
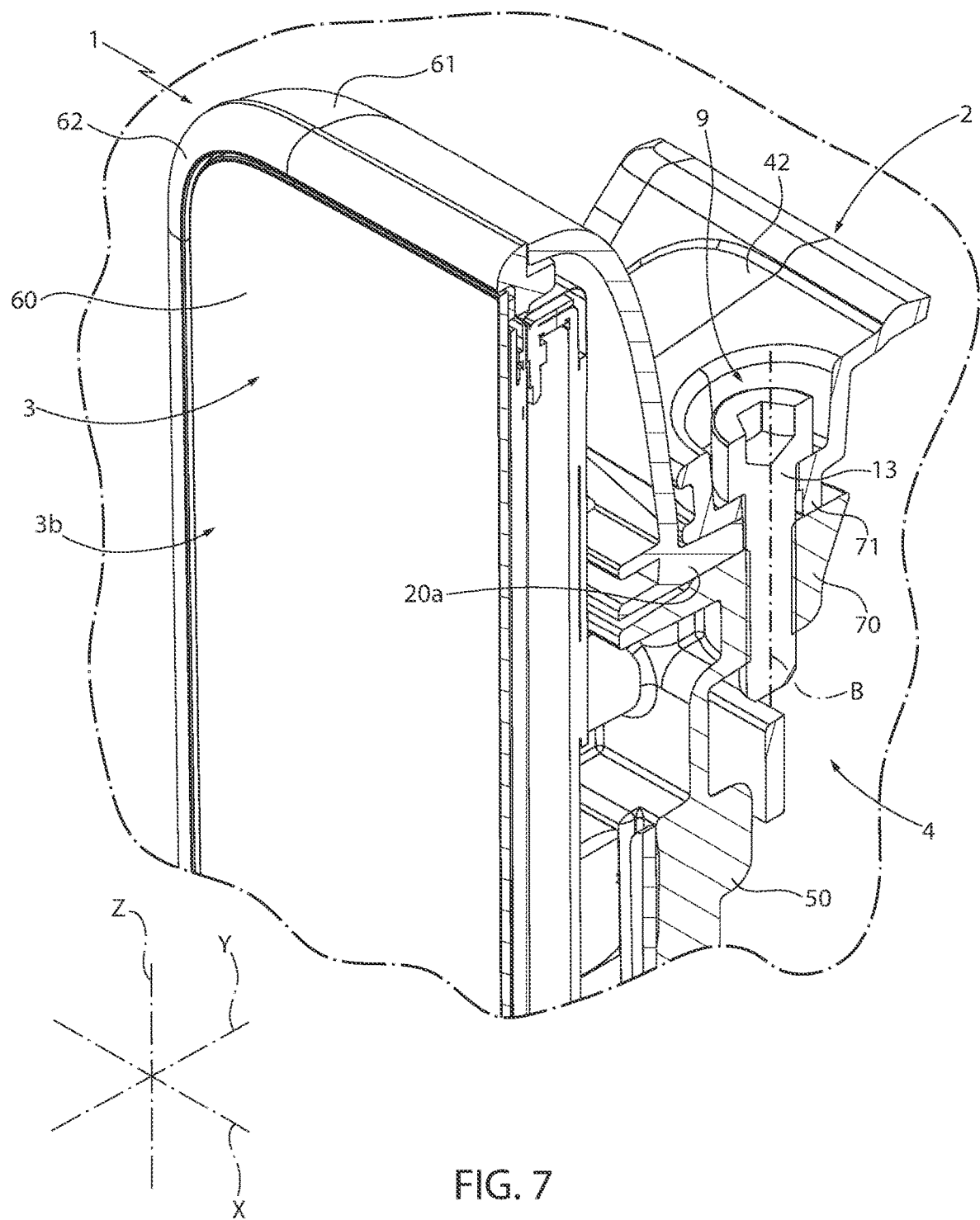

In particular, following the tightening of the screws 13, the arms 20 are tightened parallel to the direction Z between the upper portion 42 of the support element 2 and the attachment portion 50 of the frame 3 (FIG. 7).

As mentioned above, the openings 6 and the pins 7 are spaced apart by the snap fitting 8 and by the blocking devices 9 along the direction Z.

The support element 2 further comprises at least one support ridge 17 which is in relief with respect to the second face 2b, while the frame 3 comprises at least one support ridge 18 which is in relief with respect to the third face 3a and is in abutment against the ridge 17 along the direction Y. In the embodiment shown, there are provided two support ridges 17 spaced from one another along the direction X, and there are provided two corresponding support ridges 18 aligned with the ridges 17 parallel to the direction Y.

Basically, the movement of the frame 3 along the direction Y is stopped, in one direction, by the teeth 21 and, in the opposite direction, by the support between the ridges 17 and 18.

Furthermore, a slot 32 is formed in the portion 40, while the frame 3 comprises a centring pin 33, which protrudes along the direction Y from the attachment portion and engages the slot 32 with clearance along the direction Z, and substantially without clearance along the direction X. Alternatively, the slot 32 could be obtained in the frame 3, and the centring pin 33 could be part of the support element 2.

Figure 3A:
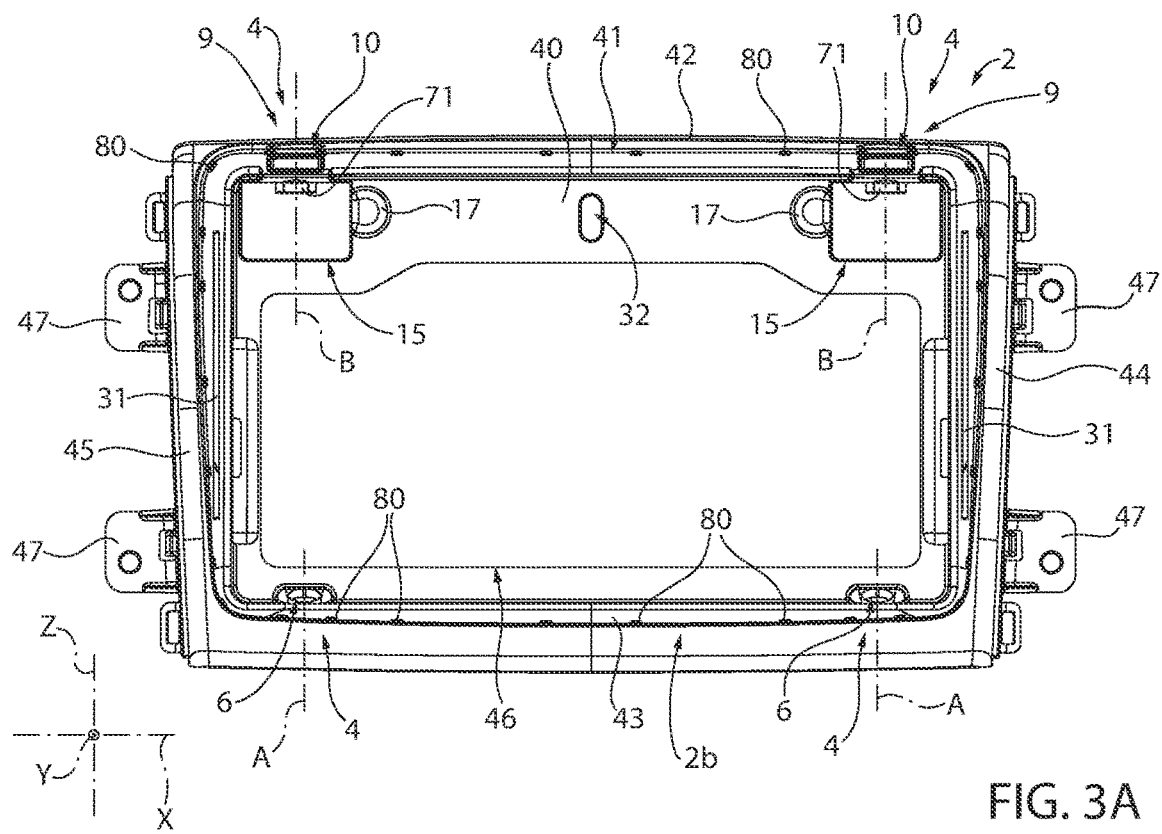
FIGS. 3A and 3B are front views of a support element of the fixing assembly of FIGS. 1 and 2.
Figure 3B:
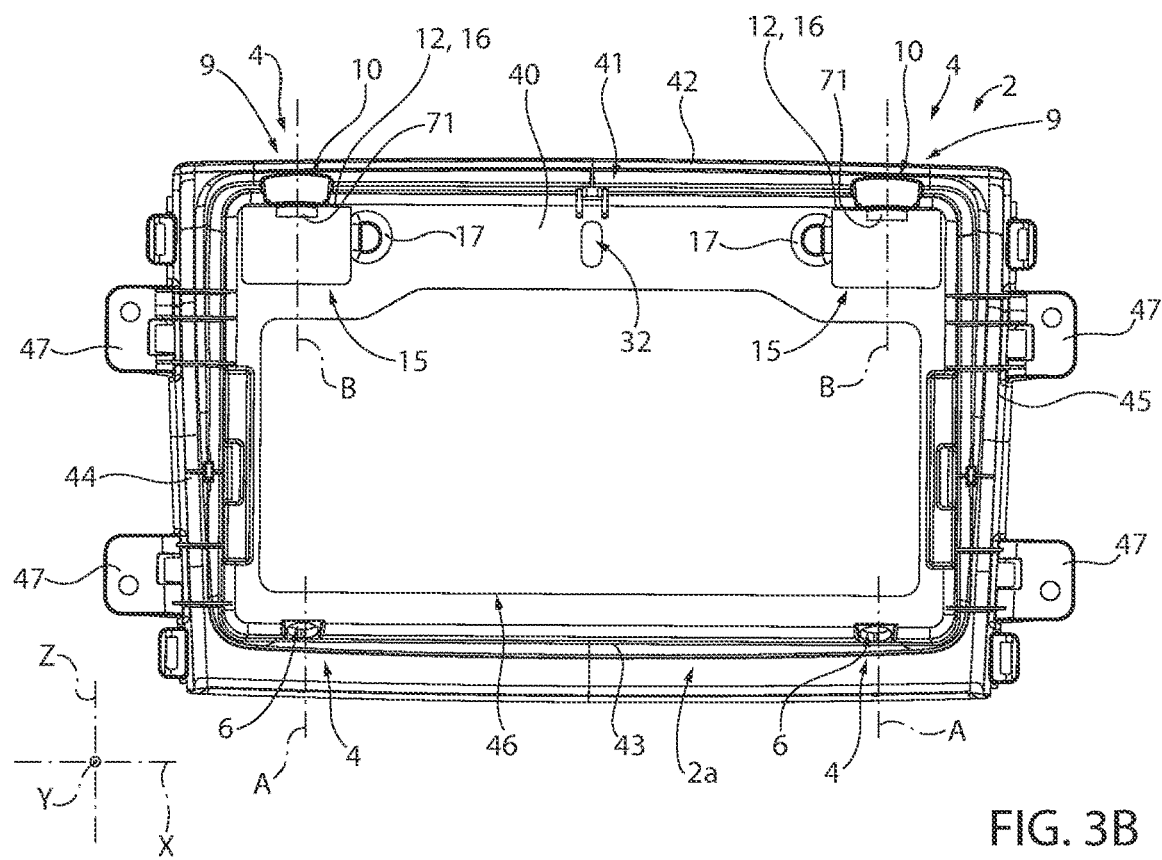

In detail, the slot 32 is passing along the direction Y. In further detail, the slot 32 is in an intermediate position between the two openings 15 (FIGS. 3A and 3B). In the embodiment shown, the slot 32 is arranged centrally, at the median plane of symmetry of the support element 2.

The fixing assembly 1 further comprises a plurality of protuberances 80, which help to define the relative positioning between the support element 2 and the frame 3 along the direction Y (FIGS. 2 and 3A).

In detail, said protuberances 80 form part of the support element 2, protrude from the second face 2b along the direction Y and are placed in abutment against the frame 3 on the side of the third face 3a along the direction Y. Alternatively, the protuberances 80 may form part of the frame 3 and may be placed in abutment against the support element 2.

The protuberances 80 can be made of damping material.

Alternatively, the fixing assembly 1 could comprise a single continuous protuberance 80 forming part of the support element 2, protruding from the second face 2b and placed in abutment against the frame 3 on the side of the third face 3a along the direction Y.

Furthermore, the support element 2 comprises one or more projections 31, which protrude parallel to the direction Y so as to conceal the clearance along the direction Y between the support element 2 and the frame 3 due to the protuberances 80. Consequently, due to the projections 31, the internal parts of the second face 2b and/or the third face 3a are not visible to the occupants of the passenger compartment of the vehicle.

Alternatively, the projections 31 may form part of the frame 3.

In particular, the projections 31 are defined by ribs that are parallel to the direction Z and protrude starting from the side portions 44 and 45, respectively.

The mounting of the fixing assembly 1 is described below starting from a condition wherein the frame 3 is decoupled from the support element 2, and the latter is fixed with respect to the dashboard (forming part of the dashboard itself, or being fixed to it by means of the fixing appendages 47 and the corresponding screws, not shown).

In particular, the first face 2a is arranged towards the inside of the dashboard, and the second face 2b faces the passenger compartment of the vehicle.

First of all, the pins 7 are engaged in the openings 6 with a downward movement. In particular, the head 7a is placed in abutment against the lower portion 43 of the support element 2.

During the coupling of the pins 7 in the openings 6, this coupling is such that it defines a hinge around an axis parallel to the direction X, whereby the frame 3 is rotated with respect to the support element 2 and brought closer to the latter.

During this rotation, the elastically deformable elements 14 are brought to engage the openings 15 and the centring pin 33 is brought to engage the slot 32, where the clearance along the direction Z does not hinder the rotation and approach trajectory of the frame 3, but the edge of the slot 32 holds the frame 3 in a stable position along the direction X.

At the end of the rotation stroke, each tooth 21 comes into contact with the edge 16 of the relative opening 15. By further forcing the rotation through a thrust on the frame 3 towards the support element 2, the reaction exerted by the edges 16 on the ends of the arms 20 causes the elastic deformation thereof towards the lower portion 43. This allows each tooth 21 to pass completely through the relative opening 15 and to protrude beyond it, so as to snap-fit with the retention shoulder 12.

At the end of the rotation stroke, the slot 32 performs a retention action on the pin 33.

The rotation of the frame 3 ends, in particular, when the ridges 17 and 18 abut one another.

At this point, the displacement of the frame 3 along the direction Y is prevented by the snap fitting 8, on the upper side, and by the engagement of the pins 7 in the openings 6, on the lower side. Any coupling tolerance along the direction Y is compensated for on the lower side by the elasticity of the softer coating provided on the pins 7.

After the teeth 21 have been snap-fitted, the fixing assembly 1 is in the assembled configuration.

In particular, as explained above, the frame 3 is blocked along the direction Y by the teeth 21 of the elastically deformable elements 14 and by the support between the ridges 17 and 18, which define an end of stroke during the approach rotation of the frame 3 (FIG. 4). The coupling of the pins 7 in the openings 6 also defines a reference along the direction Y.

The reference along the axis X is essentially given by the coupling of the pin 33 in the slot 32.

Furthermore, as explained above, thanks to the projections 31, the internal parts of the second face 2b and/or the third face 3a are not visible to the occupants of the passenger compartment of the vehicle.

In order to bring the fixing assembly 1 into the tightened configuration, the screws 13 are screwed into the holes 10 and 11. In particular, by screwing in the screws 13, the frame 3 is raised along the direction Z with respect to the support element 2. In this way, the frame 3 reaches its design position by generating a clearance along the direction Z between the heads 7a and the surface of the lower portion 43 which is facing the centre of the support element 2. This clearance is of the order of a few millimetres.

Therefore, as regards the reference along the axis Z, essentially the frame 3 is arranged in a fixed design position due to the tightening force of the screws 13 engaging the holes 10 and 11 along the respective axes B (FIG. 7).

Furthermore, following the tightening of the screws 13, the arms 20 are sandwiched along the direction Z between the upper portion 42 of the support element 2 and the attachment portion 50 of the frame 3 (FIG. 7).

By ensuring a precise positioning and relatively tight tolerances, the centring and retaining characteristics prevent the resulting stresses and deformations from modifying this positioning in the directions X and Y during the screwing operations for the screws 13.

From an examination of the characteristics of the fixing assembly 1 according to the present invention, the advantages that it allows obtaining are evident.

First of all, since the snap fitting 8 prevents the frame 3 from moving away along the direction Y and the blocking devices 9 subsequently block the position of the frame 3 with respect to the support element 2, the assembly can be easily assembled and respects the design tolerances.

In fact, at the end of the rotation of the frame 3 and, therefore, once the teeth 21 are snap-fitted on the retention shoulder 12, the relative positioning between the frame 3 and the support element 2 is defined in a precise manner parallel to the directions X and Y, and respects the design tolerances. The subsequent screwing of the screws 13 has the purpose of blocking the two parts in a fixed position and does not alter the relative position between them along the directions X and Y.

The relative positioning between the frame 3 and the support element 2 in the direction Z is achieved precisely and quickly following the screwing of the screws 13.

The mounting of the frame 3 is also particularly effective due to the presence of the snap fitting 8, which simplifies the assembly operations and limits the risk of any inaccuracies on the part of the operator. In particular, all the elastically deformable elements 14 couple simultaneously, and there is no need to provide for additional retention elements, before screwing in the screws 13. Furthermore, there is no need to provide for metal elastic elements or additional springs, thanks to the snap fitting 8, as the arms 20 are per se flexible and are made as one piece with the attachment portion 50 and/or with the housing portion 61 (or a portion of the support element 2).

Finally, it is clear from the foregoing that modifications and variations may be made to the fixing assembly 1 described and shown which do not go beyond the scope of protection of the present invention, as defined in the appended claims.

For example, the shape of the various parts could be different from what is indicated by way of example, but always suitable for conferring the functions of reference, positioning, retention described above and always so that the elastically deformable elements are made as elements of polymeric or elastomeric material in one piece with the remaining parts of the assembly 1.

The invention claimed is:

1. A fixing assembly (1) for fixing an accessory (60) to a vehicle component; the assembly (1) comprising:
   a support element (2) adapted to be fixed to said component or forming part of said component; said support element (2) comprising a first face (2a) and a second face (2b) opposite to said first face (2a) along a first direction (Y);
   a frame (3) adapted to support said accessory (60) in a relative fixed position and having a third face (3a), at least partially facing said second face (2b), and a fourth face (3b) opposite to said third face (3a) along said first direction (Y);
   at least one opening (6) formed in one of said support element (2) and said frame (3) and at least one protruding pin (7) forming part of the other of said support element (2) and said frame (3); said protruding pin (7) engaging said opening (6) so as to enable a rotation of said frame (3) with respect to said support element (2) about a second direction (X), orthogonal to said first direction (Y), during a mounting step in which said protruding pin (7) is inserted in said opening (6) to connect said frame (3) to said support element (2) in a fixed position;
   snap-fitting (8) for preventing the displacement of said frame (3) from said support element (2) along said first direction (Y) at the end of the aforementioned rotation; and
   at least a first hole (10) formed in said support element (2) along an axis (B) parallel to a third direction (Z), at least a second hole (11) formed in said frame (3) coaxially to said first hole (10), and at least one fixing pin (13) engaging said first and second holes (10, 11) to block said frame (3) with respect to said support element (2); said third direction (Z) being orthogonal to said first and second directions (Y, X);
   wherein said snap-fitting (8) includes at least one retention shoulder (12) on one of said support element (2) and said frame (3), and at least one elastically deformable element (14) snap-fitted to said retention shoulder (12) and forming part of a portion made of polymeric or elastomeric material of the other of said support element (2) and said frame (3).

2. The fixing assembly according to claim 1, wherein said elastically deformable element (14) forms part of said frame (3).

3. The fixing assembly according to claim 2, wherein said retention shoulder (12) is arranged at said first face (2a).

4. The fixing assembly according to claim 2, wherein said elastically deformable element (14) comprises an arm (20) which extends in a cantilever fashion with respect to said third face (3a) along said first direction (Y).

5. The fixing assembly according to claim 3, wherein said support element (2) comprises a through opening (15); said elastically deformable element (14) engaging said through opening (15) in order to protrude beyond said first face (2a); said through opening (15) having an edge (16) from which said retention shoulder (12) extends.

6. The fixing assembly according to claim 1, wherein said snap-fitting (8) includes two elastically deformable elements (14), diametrically opposite to one another in relation to said second hole (11) along said second direction (X).

7. The fixing assembly according to claim 6, further including two first holes (10) spaced from one another along said second direction (X) and two second holes (11) coaxial with respect to said first holes (10) to block said frame (3) with respect to said support element (2); and wherein said snap-fitting (8) comprises two pairs of said elastically deformable elements (14); the elastically deformable elements (14) of each pair being diametrically opposite to one another in relation to a respective said second hole (11) along said second direction (X).

8. The fixing assembly according to claim 1, wherein said support element (2) comprises a first support (17) at said second face (2b), and said frame (3) comprises a second support (18) arranged at said third face (3a) and in abutment against said first support (17) along said first direction (Y).

9. The fixing assembly according to claim 1, wherein said elastically deformable element (14) comprises: an arm (20) parallel to said first direction (Y), and a tooth (21) which protrudes from said arm (20) transversely to said first direction (Y).

10. The fixing assembly according to claim 1, wherein said protruding pin (7) comprises a core and a coating of polymeric or elastomeric material arranged on said core.

11. The fixing assembly according to claim 1, further including two said openings (6) spaced from one another along said second direction (X) and two said protruding pins (7), which respectively engage the two said openings (6).

12. The fixing assembly according to claim 1, wherein said opening (6) and said protruding pin (7) are spaced from said snap-fitting (8) along said third direction (Z).

13. The fixing assembly according to claim 1, wherein one of said support element (2) and said frame (3) comprises at least one projection (33) which extends in a cantilever fashion parallel to said first direction (Y) for engaging a corresponding seat (32) formed in the other of said support element (2) and said frame (3).

14. The fixing assembly according to claim 13, wherein said projection is defined by a centering pin (33), which engages said seat (32) with clearance along said third direction (Z).

* * * * *